United States Patent [19]

Daman

[11] 4,275,668
[45] Jun. 30, 1981

[54] COAL FEED SYSTEM FOR A FLUIDIZED BED COMBUSTOR

[75] Inventor: Ernest L. Daman, Westfield, N.J.

[73] Assignee: Foster Wheeler Energy Corporation, Livingston, N.J.

[21] Appl. No.: 182,207

[22] Filed: Aug. 28, 1980

[51] Int. Cl.³ .......................... F23G 5/00; F23G 7/00; F22B 1/00
[52] U.S. Cl. ................................. 110/245; 110/101 R; 110/265; 122/4 D
[58] Field of Search .................... 110/223, 115, 101 R, 110/111, 267, 327, 243–245, 263–265, 287, 288, 292, 293; 122/4 D

[56] References Cited

U.S. PATENT DOCUMENTS

| | | | |
|---|---|---|---|
| 2,638,684 | 5/1953 | Jukkola | 110/264 |
| 2,917,011 | 12/1959 | Korner | 110/264 |
| 4,184,456 | 1/1980 | Taylor et al. | 110/245 |

FOREIGN PATENT DOCUMENTS 2612198  9/1977  Fed. Rep. of Germany .......... 110/245

Primary Examiner—Henry C. Yuen
Attorney, Agent, or Firm—Marvin A. Naigur; John E. Wilson; John J. Herguth, Jr.

[57] ABSTRACT

A coal feed system for use in a fluidized bed combustor in which a grate is supported in a housing and is adapted to support a bed of particulate material including a combustible fuel. Air is passed through the grate and into the bed to fluidize the particulate material. The particulate fuel material is separated externally of the bed into a relatively coarse material and a relatively fine material. The fine material is agglomerated and it, along with the coarse material, is passed to a distributor which distributes the material onto selected areas extending across the upper surface of the bed.

7 Claims, 1 Drawing Figure

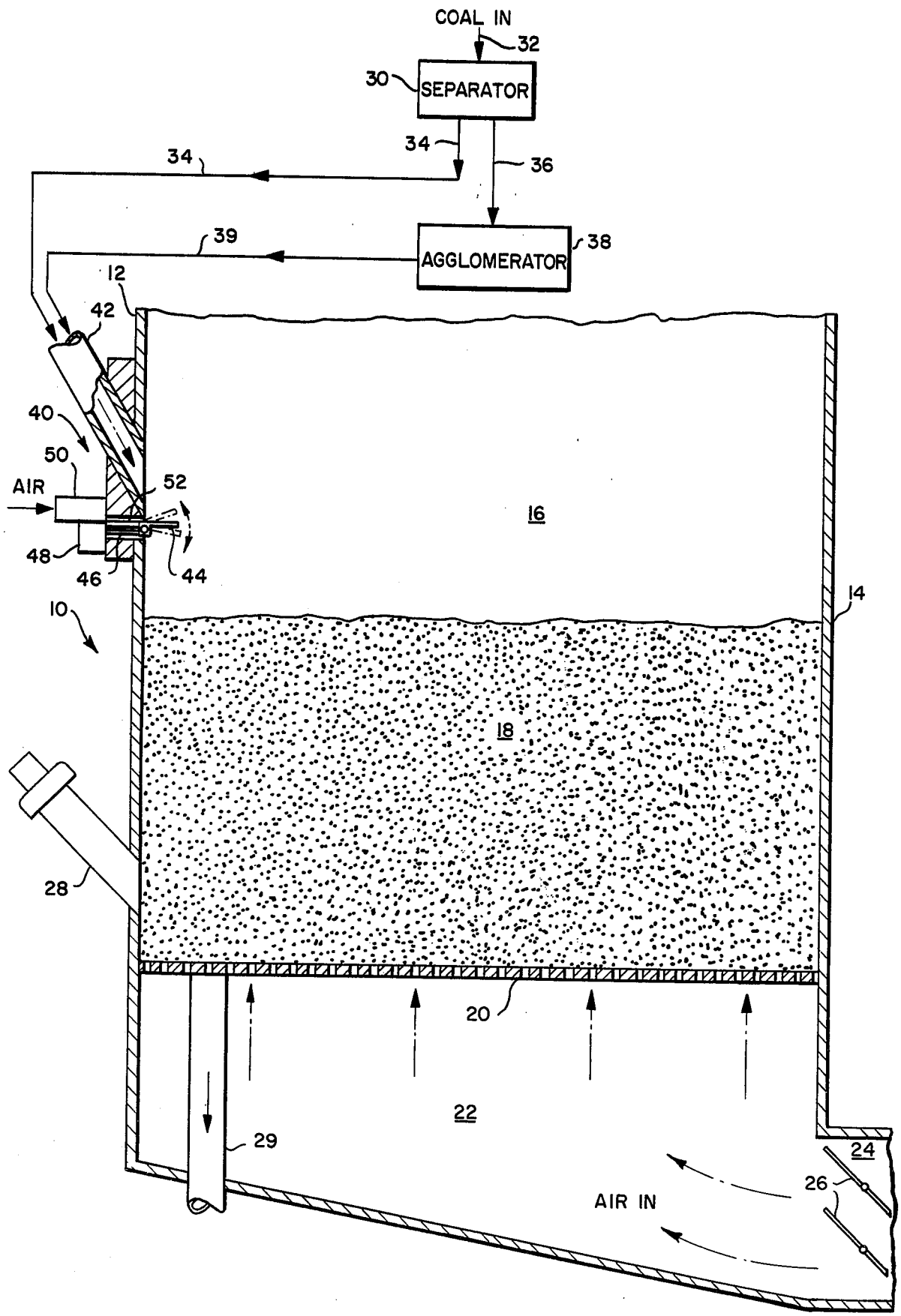

COAL FEED SYSTEM FOR A FLUIDIZED BED COMBUSTOR

BACKGROUND OF THE INVENTION

This invention relates to a fluidized bed combustor and, more particularly, to an improved particulate coal feed system for such a combustor.

The use of fluidized beds has long been recognized as an attractive way of generating heat. In a normal fluidized bed arrangment, air is passed through a bed of particulate material, which usually includes a mixture of inert material, and a fuel material such as high sulfur bituminous coal. As a result of the air passing through the bed, the bed behaves like a boiling liquid which promotes the combustion of the fuel. The basic advantages of such an arrangement include a relatively high heat transfer rate, substantially uniform bed temperature, combustion at relatively low temperatures, a reduction in corrosion and boiler fouling and a reduction in boiler size.

In these arrangements, the particulate fuel material must be continuously, or at least periodically, distributed into the bed to replenish the spent material expended in the combustion process. Many conventional systems utilize a feeder, or feeders, for distributing the particulate fuel material from a position above the upper surface of the bed where it falls by gravity onto the latter surface. However, a great majority of the commercial coal that is available is of a relatively large particle size range, which may extend from very small particles to particles that will pass through a two-inch screen. Therefore, the distribution of the particulate fuel material onto the upper surface of the bed presents problems since, if the particulate fuel material is relatively small, the combination of the upwardly rising combustion gases and air passing through the bed will blow the material out of the top of the combustor before it is burned.

It also has been suggested to provide in-bed feeding systems in which the particulate fuel material is introduced directly into the bed from a point below the upper surface of the bed. Although these systems avoid the above problems, they present additional problems since the lateral transfer or dispersion of the materials through the bed is relatively poor, requiring a multiplicity of feed points to prevent hot spots or over-cool spots. This, of course, increases the cost of the installation.

SUMMARY OF THE INVENTION

It is therefore an object of the present invention to provide a coal feed system for a fluidized bed combustor in which an optimum distribution of a particulate fuel material of a relatively large particle size range is achieved.

It is a further object of the present invention to provide a system of the above type in which the particulate fuel material is separated into a relatively course material and a relatively fine material which is agglomerated before being distributed to the bed.

It is a still further object of the present invention to provide a system of the above type in which the coarse particulate material and the agglomerated material are both distributed from a single distributor to selected areas across the upper surface of the bed.

Toward the fulfillment of these and other objects, the system of the present invention comprises a fluidized bed combustor including grate means supported in a housing and adapted to receive on its upper surface a bed of particulate material at least a portion of which is combustible. The particulate fuel material is separated externally of the bed, with the relatively fine particulate fuel material from the separator being agglomerated and passed, along with the relatively coarse material, to a single distributor located above the upper surface of the bed. The distributor is adapted to distribute the coarse material and the agglomerated fine material to selected areas extending across the upper surface of the bed.

DESCRIPTION OF THE DRAWING

The above brief description, as well as further objects, features, and advantages, of the present invention will be more fully appreciated by reference to the following detailed description of a presently preferred but nonetheless illustrative embodiment in accordance with the present invention, when taken in conjunction with the accompanying drawing, which is a vertical sectional view of the apparatus of the present invention.

DESCRIPTION OF THE PREFERRED EMBODIMENT

Referring to the drawing, the reference numeral 10 refers in general to a fluidized bed combuster of the present invention consisting of a front wall 12, a rear wall 14, and two sidewalls, one of which is shown by the reference numeral 16. The upper portion of the combustor 10 is not shown for the convenience of presentation, it being understood that it consists of a convection section, a roof and an outlet for allowing the combustion gases to discharge, in a conventional manner.

A bed of particulate material, shown in general by the reference numeral 18, is disposed within the combustor 10 and rests on a perforated grate 20 extending horizontally in the lower portion of the boiler. The bed 18 can consist of a mixture of discrete particles of inert material and fuel material such as bituminous coal.

An air plenum chamber 22 is provided immediately below the grate 20 and an air inlet 24 is provided through the rear wall 14 in communication with the chamber 22 for distributing air from an external source (not shown) to the chamber. A pair of air dampers 26 are provided in the inlet 24 for controlling the flow of air into the chamber 22. The dampers 26 are suitably mounted in the inlet 24 for pivotal movement about their centers in response to actuation of external controls (not shown) to vary the effective openings in the inlet and thus control the flow of air through the inlet and into the chamber 22. Since the dampers 26 are of a conventional design they will not be described in any further detail.

A bed light-off burner 28 is mounted through the front wall 12 immediately above the grate 20 for initially lighting off the bed 18 during startup and a bed tap, or drain pipe 29 extends from a corresponding opening formed in the grate 20 to a position below the chamber 22 for discharging the spent materials from the bed 18.

A separator, shown in general by the reference numeral 30, is located externally of the boiler 10 and is adapted to receive particulate fuel material, such as coal, of a relative large particle size range from an external source (not shown), such as coal crusher, via a duct 32. The separator 30 adapted to separate the fuel material in a conventional manner, such as by the use of a screen or screens, into relatively coarse and relatively fine particles. The relatively coarse particles are passed from the separator 30 via a duct 34 and the relatively fine particles are passed from the separator via a duct 36. As an example, the separator 30 can be adapted to separate particles greater than 1/16 of an inch in diameter from those less than 1/16 of an inch and pass the former to the duct 34 and the latter to the duct 36.

An agglomerator, shown in general by the reference numeral 38, receives the fine particles from the duct 36 and is designed to agglomerate the particles into coarser particles by any conventional technique. For example, if the particles contain any moisture, they can be agglomerated by pelletizing in a disc pelletizer, such as the Series 7000 pellet mill manufactured by the California Pellet Mill Co. Alternatively, if the fine particles are relatively dry they can be agglomerated on a roll briquetter or an extruder of a conventional type.

A duct 39 connects the output of the agglomerator 38 to a distributor, shown in general by the reference numeral 40, which also receives the coarse particles from the duct 34. The distributor 40 is mounted relative to the upper portion of the front wall 12 and operates to distribute the mixture of course particles from the duct 34 and the agglomerated particles from the duct 39 onto selected areas across the upper surface of the bed 18.

The distributor 40 includes an inlet pipe 42 for receiving the coarse coal particles from the duct 34 and the agglomerated material from the duct 39 where they are mixed and fed, by gravity, onto a distributor tray 44 which extends immediately below the outlet end of the pipe 42 and into the interior of the combustor 10. The tray 44 is pivotally mounted relative to an actuating lever 46 for controlling the angular position of the tray relative to the upper surface of the bed as shown, for example, by the one position represented by the solid lines and the two positions represented by the dashed lines. A control unit for the lever 46 is shown in general by the reference numeral 48 and operates in a conventional manner to control the pivotal movement of the tray 44.

The distributor 40 also includes an air distributor unit, shown in general by the reference numeral 50, for distributing pressurized air at a selected rate through a plurality of vanes, one of which is shown by the reference numeral 52, located immediately above the tray 44, to inject the air across the coal particles on the tray. As a result, the coal particles are distributed to selected areas extending across the upper surface of the bed 18 which are determined by the position of the tray 44 under the control of the lever 46 and the unit 48. For example, in the uppermost position of the free end of the tray 44 as viewed in the drawing, the particles falling onto the tray from the pipe 42 would be propelled by the air from the unit 50 towards the rear wall 14, and would fall onto the rear portion (i.e., the right hand portion as viewed in the drawings) of the upper surface of the bed 18. Similarly, in the lowermost position of the tray 44 as shown in the drawings, the particles would be distributed onto the front portion (i.e., the left hand portion as viewed in the drawing) of the upper surface of the bed 18. Since the tray 44 can be pivoted to an infinite number of angular positions relative to the upper surface of the bed 18 under control of the lever 46 and the control unit 48, it can be appreciated that an accurate control of the precise location of the particulate feed across the upper surface of the bed can be achieved.

In operation, the bed 18 is started up by opening the dampers 26 associated with the air inlet 24 to distribute air upwardly through the compartment 22, through the perforations in the grate 20 and into the bed 18. This loosens the particulate material in the bed 18 and reduces material packing and bridging.

The separator 30 and the agglomerator 38 are activated, and operate as discussed above, to feed coarse and agglomerated particulate fuel material, via the ducts 34 and 39, respectively, to the inlet pipe 42.

The light-off burner 28 is then fired to heat the material in the bed 18 until the temperature of the material reaches a predetermined level, at which time the distributor 40 is activated to distribute the mixture of coarse and agglomerated particulate fuel from the inlet pipe 42 onto selected areas extending across the upper surface of the bed 18 as determined by the position of the tray 44, to insure a uniform distribution across the upper surface.

After the bed 18 has been fluidized and has reached a predetermined elevated temperature, the light-off burner 28 is turned off while the distributor 40 continues to distribute the particulate fuel across the upper surface of the bed 18 in accordance with predetermined feed rates.

It is understood that if the combustor is used for the purpose of steam generation, a pluraity of heat exchange tubes carrying the fluid to be heated, such as water, may be routed through the interior of the combustor in a conventional manner, with these tubes being omitted in the drawing for the convenience of presentation. In the event that the combustor is used for other purposes, such as gasification, or the like, the water walls and tubes may be omitted and conventional refractory construction used to contain the fluid bed can be added.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A fluidized bed combustor comprising a housing, grate means supported in said housing and adapted to support a bed of particulate material at least a portion of which is combustible, means for passing air through said grate means and said particulate material to fluidize said particulate material, means for receiving particulate fuel material and separating said material into relatively fine particles and relatively coarse particles, a distributor supported by said housing at an elevated position relative to the upper surface of said bed, means for passing said relative coarse particles to said distributor, agglomeration means for receiving said fine particles from said separating means and agglomerating said fine particles, and means for passing said agglomerated particles to said distributor, said distributor including means for distributing said particles onto selected areas extending across the upper surface of said bed.

2. The combustor of claim 1 further comprising means for passing said fine particles from said separating means to said agglomeration means.

3. The combustor of claim 1 wherein said distributor includes inlet means for receiving said course particles and said agglomerated particles.

4. The combustor of claim 3 wherein said inlet means includes a pipe in which said coarse particles and said agglomerated particles are mixed.

5. The combustor of claim 3 wherein said distributing means includes a tray for receiving said particles from said inlet means and adapted to move to a plurality of angular positions relative to the upper surface of said bed.

6. The combustor of claim 5 further comprising means for injecting air across the particles on said tray to propel said particles across the upper surface of said bed.

7. The combustor of claim 6 wherein said areas are determined by the angular positions of said tray.

* * * * *